April 1, 1969
B. J. DAMIANI
3,435,984
SAFETY VENT STRUCTURE
Filed June 2, 1967
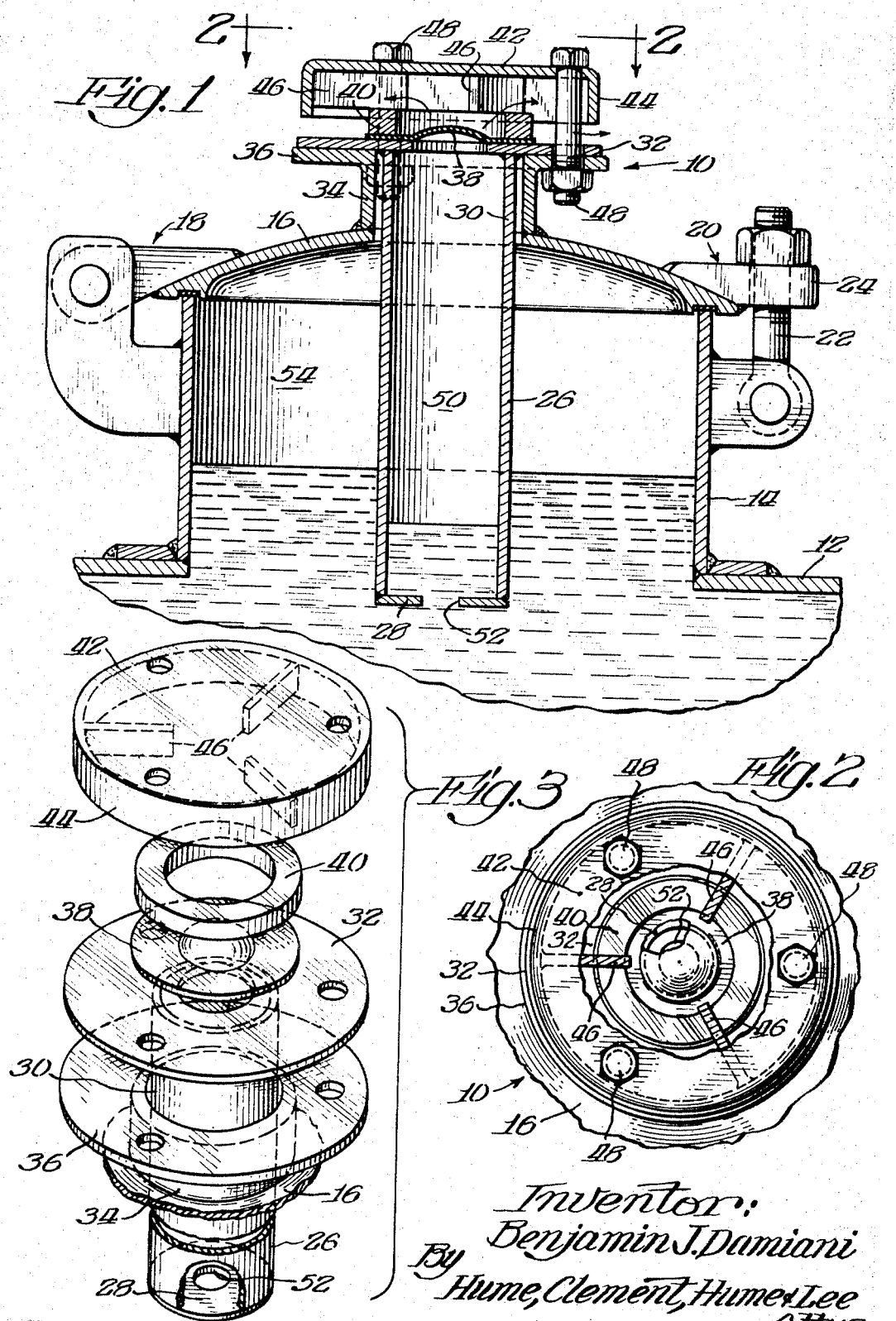
Inventor:
Benjamin J. Damiani
By Hume, Clement, Hume & Lee
Attys

United States Patent Office 3,435,984
Patented Apr. 1, 1969

3,435,984
SAFETY VENT STRUCTURE
Benjamin J. Damiani, Flossmoor, Ill., assignor, by mesne assignments, to Union Tank Car Company, a corporation of Delaware
Filed June 2, 1967, Ser. No. 643,283
Int. Cl. B65d 25/00
U.S. Cl. 220—89       3 Claims

ABSTRACT OF THE DISCLOSURE

A safety vent structure for tank cars and the like. A baffle member which defines a surge chamber is mounted in a manway or expansion dome, with the upper portion of the baffle extending through the dome cover. The upper portion of the baffle holds a frangible disc designed to rupture and vent the surge chamber to atmosphere when the pressure within the chamber exceeds a predetermined limit. The lower portion of the baffle defines a passageway which provides fluid communication with the interior of the tank. The sectional area of the passageway is less than the sectional area of the baffle, so that pressure within the chamber increases at a slower rate than pressure within the tank.

---

This invention relates to a safety vent structure for use with tanks, and particularly, with transportable tanks such as are associated with railway tank cars and the like. Although the invention will be described in the environmental context of a railway tank car, it should be understood that it may be advantageously employed in connection with many other types of fluid storage or transport units.

A fluid being transported in a railway tank car, as for example a volatile liquid, may under certain conditions create a pressure within the tank that exceeds a maximum permissible level dictated by the design characteristics of the tank and the materials from which it is formed. Accordingly, it has long been the practice to provide safety vents which automatically vent the tank to atmosphere when this maximum permissible pressure level is reached, thus preventing tank damage or failure. One common type of safety vent designed for this purpose has involved the use of a frangible element, such as a thin lead disc, one side of which is in fluid communication with the interior of the tank and the other side of which is in fluid communication with the atmosphere. Thus, when the pressure within the tank reaches the maximum permissible level, the frangible element ruptures, allowing fluid within the tank to escape to atmosphere and thus reducing the tank pressure.

Such prior devices, however, have not been found to be entirely satisfactory, inasmuch as they have not had the ability to discriminate between transient as opposed to steady state pressure overloads. For example, in the case of a tank car containing a liquid, an impact or other sudden acceleration applied to the car will cause a momentary surge of liquid within the car. This momentary surge of liquid will in turn compress the gas in the space above the liquid, and may thereby cause an isolated transient pressure increase within the car which exceeds the predetermined maximum safety level. Under such conditions, the prior art safety vent structures would be actuated to vent the interior of the tank to atmosphere to relieve the overpressure, even though the overpressure is only momentary, and the steady state pressure within the tank remains below the maximum permissible level. This is clearly undesirable, particularly where the safety vent employs a frangible element as the pressure responsive means, since the tank is opened to atmosphere and the liquid may splash out of the tank or be contaminated. Accordingly, it is desirable to provide a safety vent structure which is not responsive to transient pressure overloads and which operates to vent the interior of the tank to atmosphere only when the steady state pressure within the tank exceeds the maximum permissible level.

In order to accomplish the foregoing goal of discrimination between transient and steady state pressure overloads, the present invention provides a baffle structure which defines a surge chamber and which is mounted within a manway or expansion dome or other covered dome-like structure on the tank car. The baffle includes first and second end portions, with the first end portion extending through the dome cover and terminating externally of the tank. A pressure responsive means, preferably a frangible element, is associated with the first end portion of the baffle and operates in response to an overpressure within the surge chamber to vent the chamber to atmosphere. The second end portion of the baffle defines a passageway which provides fluid communication between the surge chamber and the interior of the tank. The sectional area of the passageway is less than the sectional area of the baffle, with the result that the fluid level and consequently the pressure within the chamber increases at a slower rate than that within the dome itself. Thus, the pressure increase resulting from a momentary liquid surge within the tank is effectively delayed, so that the pressure effects of the surge subside before the pressure within the surge chamber increases sufficiently to actuate the pressure responsive means. In this manner, the pressure responsive means is actuated only by a steady state overpressure.

A safety vent structure constructed in accordance with the present invention may be readily installed in existing tank cars and other fluid storage or transport units. Since the structure is mounted within a dome on the tank, installation does not require modification of the tank wall itself.

The foregoing objects and features of the invention will be more fully appreciated in light of the following detailed description, with illustrative reference to the drawing, in which:

FIGURE 1 is a sectional elevation of an exemplary safety vent structure constructed in accordance with the invention and associated with a portion of a tank car;

FIGURE 2 is a plan view of the safety vent structure, taken on the line 2—2 of FIGURE 1; and FIGURE 3 is an exploded view of the safety vent structure.

Description of exemplary embodiment

With reference to the drawing, there is shown a preferred embodiment of a safety vent structure generally denoted by the numeral 10. The safety vent structure 10 is associated with a portion of a conventional tank car which includes a tank wall 12 and a generally cylindrical manway or expansion dome 14 having a cover 16. The cover 16 is pivotally attached to the dome 14 by means of a hinge structure 18, and is secured in place thereon by a latch structure 20 which includes a pivotally mounted bolt 22 and a hasp 24.

Mounted within the dome 14 is a baffle structure 26, which is conveniently cylindrical in shape and which has a lower end portion 28 and an upper end portion 30. The upper end portion 30 of the baffle 26 extends through a suitable aperture in the cover 16 of the dome 14 and terminates in an annular flange 32.

Attached to the cover 16, by welding or other suitable means, is a cylindrical nozzle 34 which has an annular flange 36. The upper end portion 30 of the baffle 26 extends centrally through the nozzle 34, and the baffle flange 32 rests upon the nozzle flange 36. Resting in turn upon the baffle flange 32 and covering the central aperture thereof is a frangible disc 38. The disc 38 may be formed from any suitable materials, and is designed to rupture when a predetermined maximum pressure exists within the baffle 26, as is hereinafter more fully described.

An annular retainer ring 40 lies atop the frangible disc 38 and a cover 42 in turn rests upon the retainer ring. As best shown in FIGURE 3, the cover 42 includes a downwardly extending rim 44, and a plurality of inwardly extending radial legs 46, which legs bear down upon the retainer ring 40. Thus, in the event of rupture of the frangible disc 38, fluid from the baffle 26 may pass through the central aperture of the retainer ring 40, between the legs 46, and out from under the rim 44 of the cover 42 as shown by the directional arrows in FIGURE 1. A plurality of bolts 48 pass through suitable apertures in the cover 42, the baffle flange 32 and the nozzle flange 36. Thus, when the bolts 48 are tightened down, the frangible disc 38 is held firmly in place between the baffle flange 32 and the retainer ring 40, and the baffle flange 32 is secured to the nozzle flange 36.

The baffle 26 defines a surge chamber 50. Thus, the upper surface of the frangible disc 38 is in fluid communication with the atmosphere, while its lower surface is in fluid communication with the surge chamber 50.

The lower end portion 28 of the baffle 26 comprises a generally annular closure plate which defines a passageway 52, the sectional area of which is less than the sectional area of the baffle 26. The illustrated fluid levels within the dome 14 and the baffle 26 are intended to represent conditions as they might exist during a momentary liquid surge. It will be noted that the liquid level within the dome 14 is substantially higher than the level within the baffle 26. This is due to the fact that the area of the passageway 52 is less than the sectional area of the baffle 26. The time rate of increase of the liquid level within the baffle 26, and consequently the rate of increase of the pressure in the surge chamber 50 above the liquid level, will lag that within the dome 14 by a function which is proportional to the ratio of the areas of the passageway 52 and the baffle 26. Thus, as the area of the passageway 52 is made larger with respect to the area of the baffle 26, the rate of increase of the liquid level and pressure within the surge chamber 50 will approach the rate of increase of the liquid level and pressure within the dome 14; conversely, as the area of the passageway 52 decreases, the rate of pressure buildup within the surge chamber 50 will lag that of the dome 14 by an increased amount.

Accordingly, the safety vent structure 10 is responsive only to steady state overpressures within the tank 12. Thus, during the liquid surge condition depicted in FIGURE 1, the pressure in the space 54 above the liquid in the dome 14 might be sufficiently high to cause the frangible disc 38 to rupture. The disc 38, however, is in fluid communication only with the surge chamber 50, and because of the lower liquid level in the baffle 26, the pressure existing in the chamber 50 is not sufficient to cause the disc 38 to rupture. It is only when the overpressure within the tank 12 persists for a relatively long period of time that the pressure in the chamber 50 is able to equal that of the space 54 and only then will the frangible disc 38 be ruptured.

The ratio of the areas of the passageway 52 and the baffle 26 will depend upon such factors as the design characteristics of the tank 12 and the type of liquid being transported, with particular reference to the maximum time during which a pressure overload may be tolerated, and the selection of appropriate ratios will be within the ability of those having ordinary skill in the art. In general, it has been found that normal transient overloads persist only for very short time intervals, typically fractions of a second, and, consequently, an area ratio which results in a corresponding time lag in pressure increase is satisfactory.

I claim:
1. In a tank having a covered dome-like structure thereon, a safety vent structure comprising: baffle means defining a surge chamber, said baffle means having first and second end portions and being mounted within said dome, with said first end portion extending through said dome cover and terminating outside said tank; a seat member associated with said first end portion and defining an opening for providing fluid communication between said surge chamber and atmosphere; a frangible element associated with said seat member to close said opening and operative to vent said surge chamber when the pressure within said surge chamber exceeds a predetermined maximum; a cover for retaining said frangible element over said opening in association with said seat member such that one side of said element is in fluid communication with said surge chamber and the other side of said element is in fluid communication with said surge chamber and the other side of said element is in fluid communication with atmosphere; and a passageway defined by said second end portion for providing fluid communication between said surge chamber and the interior of said tank, the sectional area of said passageway being less than the sectional area of said surge chamber.

2. A safety vent structure in accordance with claim 1, wherein said baffle means is a generally cylindrical structure, and wherein said second end portion comprises a closure member apertured to define said passageway.

3. A safety vent structure in accordance with claim 2, including a mounting structure affixed to the exterior of said dome cover for removably mounting said baffle means.

References Cited
UNITED STATES PATENTS

| | | |
|---|---|---|
| 929,974 | 8/1909 | McNutt. |
| 1,047,517 | 12/1912 | Harris. |
| 3,310,197 | 3/1967 | Folmsbee et al. |

RAPHAEL H. SCHWARTZ, *Primary Examiner.*

U.S. Cl. X.R.

220—85

UNITED STATES PATENT OFFICE
CERTIFICATE OF CORRECTION

Patent No. 3,435,984                                        April 1, 1969

Benjamin J. Damiani

It is certified that error appears in the above identified patent and that said Letters Patent are hereby corrected as shown below:

Column 4, lines 34 and 35, cancel "with said surge chamber and the other side of said element is in fluid communication".

Signed and sealed this 7th day of April 1970.

(SEAL)
Attest:

Edward M. Fletcher, Jr.                      WILLIAM E. SCHUYLER, JR.
Attesting Officer                                  Commissioner of Patents